UNITED STATES PATENT OFFICE.

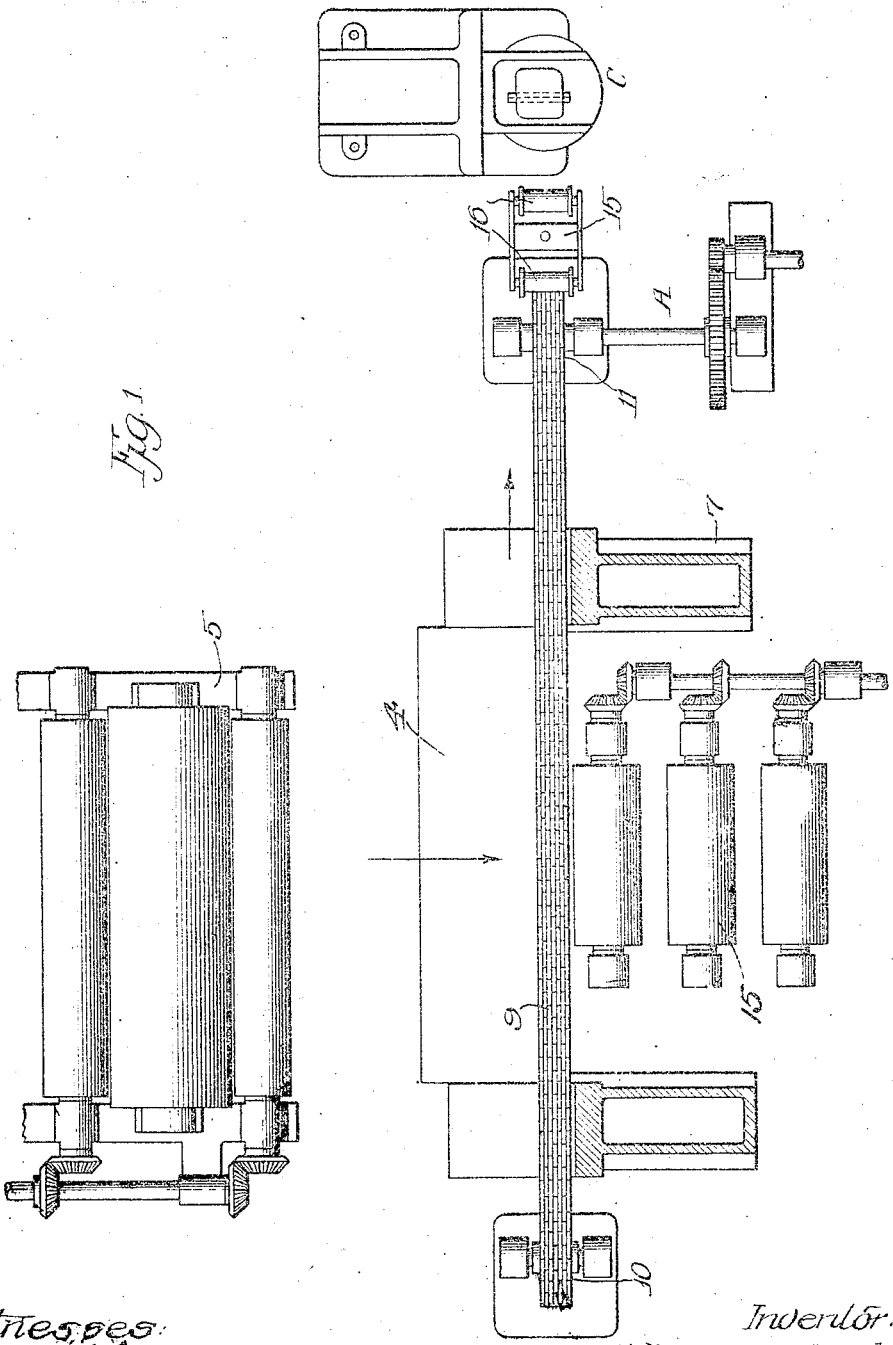

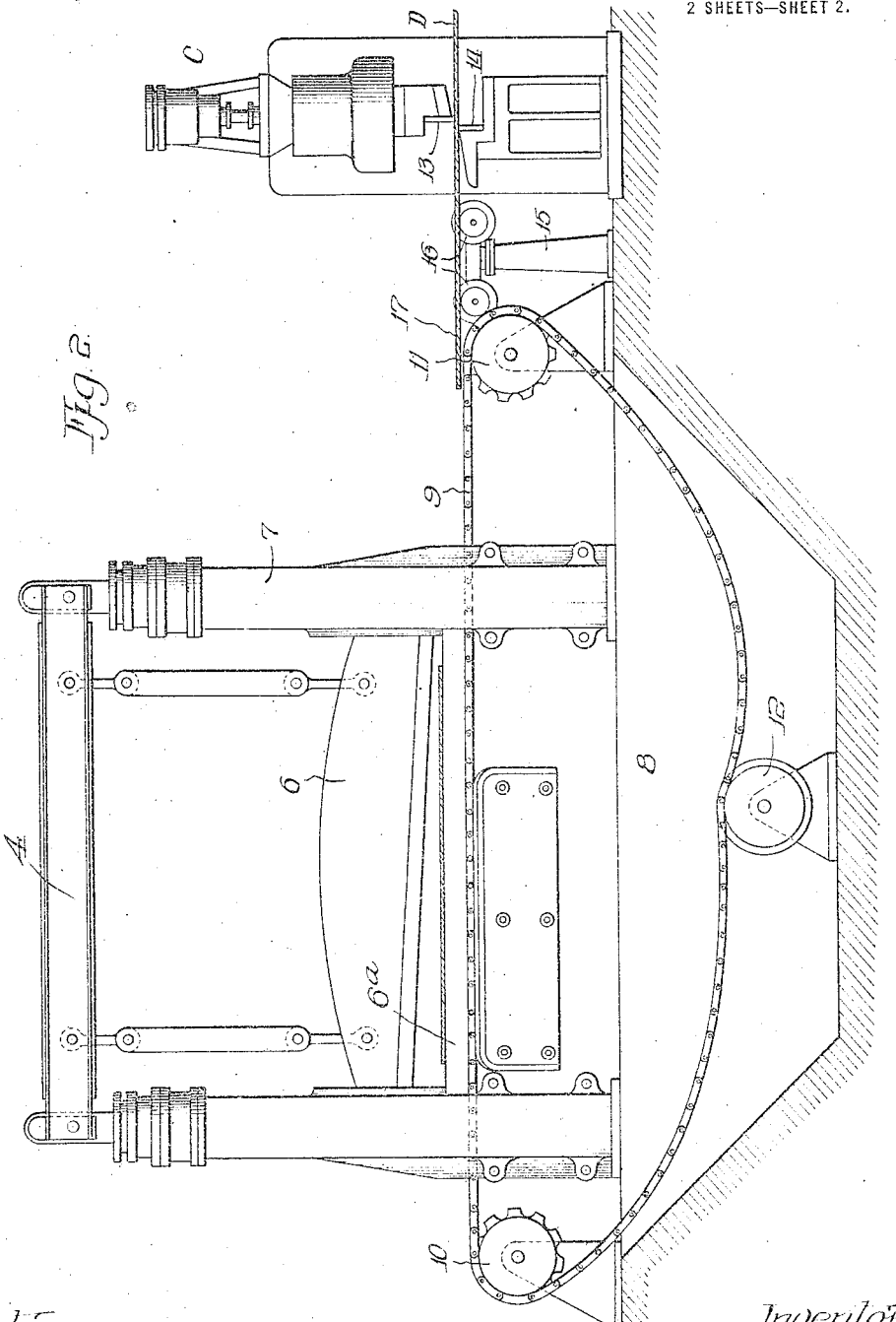

WILLIAM J. TODHUNTER, OF CHICAGO, ILLINOIS.

SCRAP-CUTTER.

1,349,020.

Specification of Letters Patent.   Patented Aug. 10, 1920.

Application filed May 10, 1918.   Serial No. 233,674.

*To all whom it may concern:*

Be it known that I, WILLIAM J. TODHUNTER, a citizen of the United States, residing at Chicago, in the county of Cook and State of Illinois, have invented a certain new and useful Improvement in Scrap-Cutters, of which the following is a specification.

My invention relates to shears and particularly to a novel manner of delivering scrap cut by plate shears to another or scrap shear for cutting the scrap into suitable lengths for use in charging boxes and the like.

One of the objects of my invention is to provide a conveyer mechanism so associated with a plate shear as to receive scrap therefrom and deliver the same to a scrap shear without any labor whatsoever being done on the scrap.

Another object is to provide a mechanical mechanism for delivering scrap from a plate shear to a source of use without any manual labor.

A further object is to eliminate labor which has heretofore been employed in removing scrap from the shears and delivering the same to a source of use.

These and other objects will be apparent from the drawings, wherein—

Figure 1 is a plan view of the preferred embodiment of my invention, only a portion of the delivery rolls and receiving rolls being shown, and Fig. 2 is an end elevation showing the preferred mounting of the endless conveyer.

The practice heretofore in shearing plates especially, has been to allow the scrap to fall on aprons from which it is withdrawn by laborers with hooks, rakes or similar tools. The laborers then as opportunity permits pile the scrap and remove it to other shears where it is recut to suitable lengths for loading in charging boxes for open hearth furnaces. The objection to this method of removing the scrap is two-fold. It causes delay at the shear when the laborers are unable to remove the scrap quickly enough to permit continuous operation of the shear. Then there is the element of danger as often times the edges of the scrap pieces are sharp inflicting severe injuries to the workmen and many times the scrap itself is very hot so that any one coming in contact with it is apt to be severely burned.

The above objections I overcome by providing an endless conveyer mounted adjacent the shear and arranged to carry the scrap from the plate shear to a scrap shear and for feeding the scrap directly thereto without requiring any labor whatsoever in connection with removal or feeding of the scrap. The conveyer is mounted immediately behind the shear knives in such a position as to catch all of the scrap as it drops and by continuously operating the conveyer no delay in operation of the shear results as the scrap is being removed as it is cut off and no accumulation occurs. Preferably, the scrap shear is placed in the path of the conveyer belt so that the scrap may be delivered directly to the scrap shear under the knife ready for recutting.

Reference is directed to the drawings wherein the preferred embodiment of my invention is shown. The feeding table 5, that is the one feeding the sheets to the shear 4, is mounted adjacent the shear. As is usual, the shear comprises the movable blade 6 carried on upstanding supports 7 which are mounted in the usual manner on foundation blocks 8 and the fixed shear 6$^a$. The connection of the shear blade 6 with the operating mechanism forming no part of my invention, hence I do not deem it necessary to show any of such mechanism.

Referring to the drawing, it will be observed that alongside of the shear knife 6, and between said knife and the feed-out conveyer 15 I mount the endless conveyer 9 suitably carried on sprockets 10, 11, the lower leg of the conveyer passing over an idler 12 mounted on the floor of the pit. The operation of the conveyer is made by means of the gear train mechanism shown at A operated in any desirable manner. The scrap shear is mounted at the right hand end of the conveyer, as seen in Fig. 2 and is designated generally by C.

The scrap shear C may be of any desired type, the one shown in the drawings having upper and lower shear blades 13 and 14, with the upper blade 13 operated by hydraulic means. The latter shear is positioned so that the planes of the blades 13 and 14 are at right angles to the plane of movement of the conveyer 9. Between the shear C and the end of the conveyer 9 is provided a guiding stand 15 having horizontally arranged rollers 16 adapted to receive the material which is scrap from the conveyer 9 and guide it between the shear blades 13, 14, of the scrap shear.

It will be noted that such an arrangement permits the plate scrap cut from the plates by the shear blades 6, 6ª, to be deposited on the conveyer 9, the top leg of which is moving toward the shear blade C. The scrap D is delivered onto the guiding table 15 and by the engagement by the rear end of the scrap with the conveyer the scrap D is moved between the shear blades 13, 14, for shearing to proper length. It will be noted that such an arrangement permits cutting of plate scrap by the scrap shear without there having to be performed any sort of manual work in connection with taking the scrap from the plate shear and delivering it to the scrap shear, an arrangement which saves a great amount of time as well as reducing the cost of adapting the scrap shear for use as scrap in open hearth furnaces, and the like.

The operation of the roll trains being in the usual manner, therefore, I do not deem it necessary to describe these parts in detail.

I am aware that scrap conveyers have been designed for conveying billet and bloom butts from the mill shear to loading places but in every instance these conveyers have been so arranged as to require a large amount of manual labor to be done in connection with transferring the butts from the conveyer to cars or charging boxes and the like. In such conveyers it is usual to provide conveyer chains in flights having connecting side chains which extend above the surface of the conveyer. In shearing plate scrap the size of the scrap varies considerably, some pieces being small and others being relatively large. Therefore, the conveyers used in connection with bloom butts could not readily be used in connection with plate scrap as the plate scrap often times extends beyond the sides of the conveyer, consequently, to overcome this objection I have devised the novel conveyer set forth herein and have arranged the various parts in such manner that the plate scrap may be carried from the plate shear and delivered to the scrap shear without being touched by a laborer in its travel, thus, making automatic the line of travel from the plate shear to the charging box; reducing the cost of labor usually involved in transporting such scrap, and eliminating entirely accidents, and burns and incidentally making possible the continuous operation in a plate shear.

I claim:—

1. The combination of a metal plate trimming shear, a work conveyer at the feed-in side of the shear, another work conveyer leading away from the shear at the scrap side thereof, a scrap carrying conveyer at the scrap side of the shear between the latter and the work conveyer and traveling at substantially right angles to the latter, and a scrap cutting shear to which the scrap carrying conveyer leads.

2. A metal plate trimming shear provided with a feed-in conveyer and a feed-out conveyer, a scrap conveyer disposed between the shear and the feed-out conveyer and traveling at an angle to said feed-out conveyer.

3. A metal plate trimming shear provided with a feed-in conveyer at one side of the shear blade, a feed out conveyer at the opposite side of the shear blade, and a scrap carrying conveyer disposed between the feed-out conveyer and the shear blade and traveling at an angle to the feed-out conveyer and disposed to receive the scrap as it discharges from the shear blade.

Signed at Chicago, State of Illinois, this 15th day of April, A. D. 1918.

WILLIAM J. TODHUNTER.